UNITED STATES PATENT OFFICE.

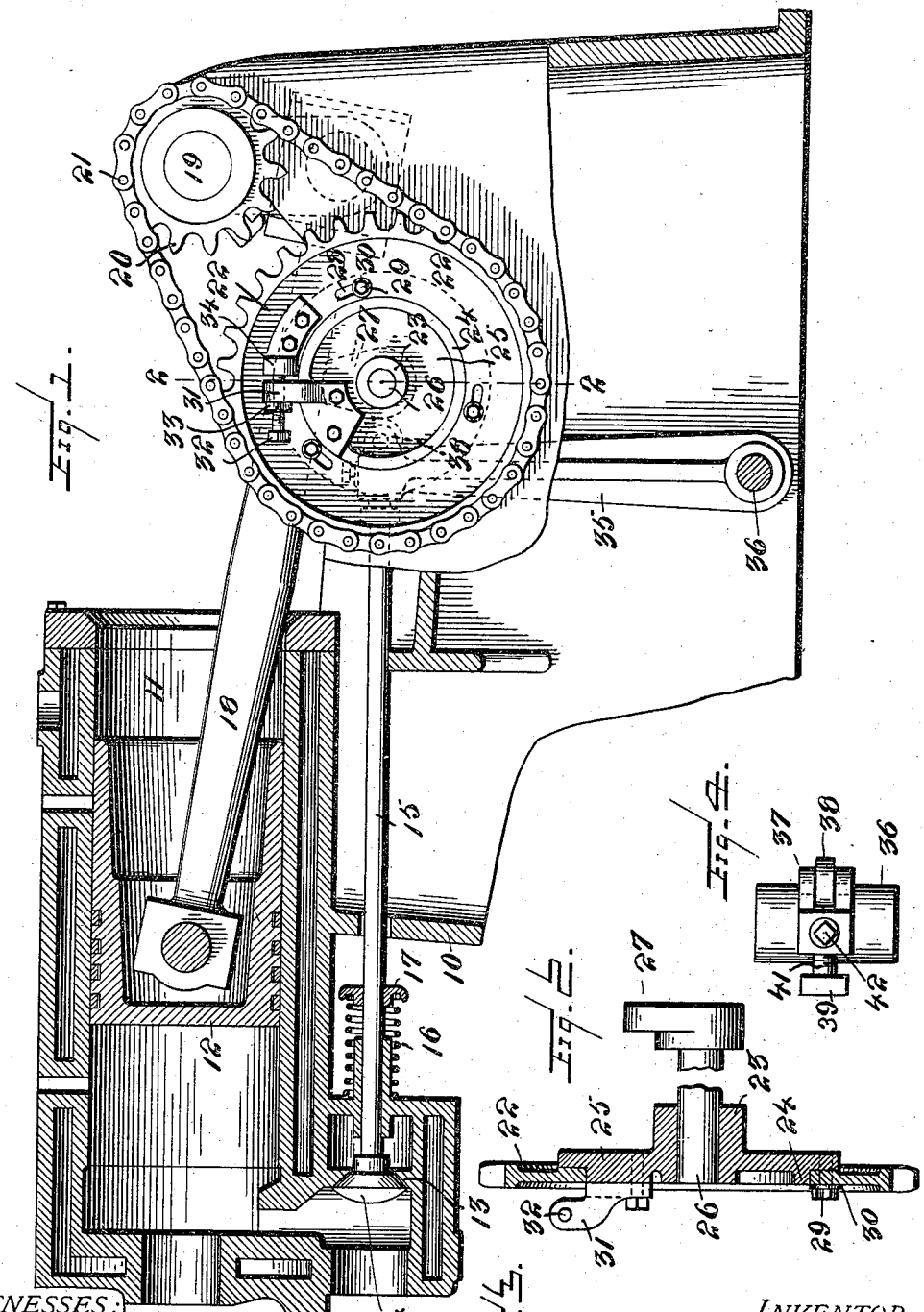

OSCAR R. HUKLE, OF LEXINGTON, KENTUCKY.

VALVE-GEAR.

950,177.

Specification of Letters Patent.    Patented Feb. 22, 1910.

Application filed June 16, 1909.   Serial No. 502,555.

*To all whom it may concern:*

Be it known that I, OSCAR R. HUKLE, citizen of the United States, residing at Lexington, county of Fayette, and State of Kentucky, have invented certain new and useful Improvements in Valve-Gears, of which the following is a specification, reference being had therein to the accompanying drawing.
This invention relates to a valve gear, and particularly to means for adjusting the actuating cam and its coöperating connections with the valve.

The invention has for an object to provide a novel and improved construction of the driving wheel and actuating cam so that the latter may be adjusted upon the wheel for the purpose of compensating for lost motion and for wear of the valve so as to accurately effect the operation of the engine valve.

A further object of the invention is to provide a novel and improved construction of rock arm provided with an adjustable tappet adapted to coöperate with a valve stem and to take up a small or fractional part of the lost motion between the members so as to secure an effective and positive operation of the valve.
Other and further objects and advantages of the invention will be hereinafter fully set forth and the novel features thereof defined by the appended claims.

In the drawing:—Figure 1 is a longitudinal section showing the invention applied to the exhaust valve of an internal combustion engine; Fig. 2 is a vertical section through the driving wheel on line 2—2, Fig. 1; Fig. 3 is a detail elevation of the rock arm; Fig. 4 is a top plan of this arm.

The invention is adapted for application to any character of valve movement, but for the purpose of illustration is here shown in connection with an internal combustion engine, to which it is particularly adapted. In this form the numeral 10 represents a portion of the engine frame which supports the cylinder 11 having the piston 12 therein. Communicating with this cylinder is the exhaust port 13 provided with the valve 14 of any desired construction from which an operating stem 15 extends. This valve is normally held in closed position by means of the coiled spring 16 bearing at one end upon the engine frame, and at its opposite end upon a disk 17 carried by the stem 15. The piston 12 is connected by a pitman 18 with the crank shaft 19 mounted in the usual manner, and this crank shaft is adapted to rotate the driving wheel for the valve gear through any desired connection, for instance, the sprocket wheel 20 secured to the crank arm and connected by the chain 21 with the sprocket 22 forming part of the driving wheel for the gear.

The parts hereinbefore described may be of any desired construction or arrangement.

The sprocket 22 comprises an annular rim mounted upon a hub 23 by means of a circumferential flange 24 carried upon the outer face of the hub disk 25. This hub is secured upon the stub shaft 26 provided with the valve actuating cam 27 of any desired construction. The rim 22 is provided with a series of slots 28 through which the retaining bolts 29 extend said bolts being provided with the washer 30. This connection with the disk of the hub permits an adjustment of the hub relative to the rim and thus keeps the cam in its relation with the valve operating connections. For the purpose of securing a fine degree of this adjustment, the disk is provided upon its outer face with a lateral lug 31 having an adjusting screw 32 threaded therethrough and adapted to be held in position by a lock nut 33 thereon. This screw contacts at its free end against a stop lug 34 secured to the rim 22 and extended laterally therefrom.

For the purpose of transmitting motion from the cam to the valve stem a rock arm 35 is provided and pivotally mounted at 36. The upper end of this arm is provided with the bifurcated pivoting ears 37 between which the friction roller 38 is mounted, as shown in Fig. 1, and adapted to contact with the cam 27. Opposite these ears a tappet 39 is adjustably mounted in the head 40 of the rock arm by means of the threaded shank 41 which is held in its adjusted position by a set screw 42 extending through the head at an angle to said shank.

In the operation of the invention, it will be seen that the cam carried by the driving wheel actuates the engine valve at predetermined intervals through the interposed rock arm, and that this cam and the hub disk upon which it is mounted are capable of adjustment relative to its driving connection for the purpose of compensating for any wear upon the engine valve, and also for a proper adjustment or timing of the cam to produce the most efficient explosion in an internal combustion engine. The construction for the adjustment of the hub upon its driving rim permits a very accurate and minute adjustment when necessary, through the adjusting screw when the retaining bolts have been released. After the proper adjustment is obtained, these bolts are again tightened to clamp the rim and hub disk firmly in contact. Under some conditions of use a very slight adjustment is desirable, and this can be secured through the adjustable tappet carried by the upper end of the rock arm. It will therefore be seen that the invention presents a simple, efficient and economically constructed form of valve gear adapted to be adjusted to secure the most efficient operation of an engine.

Having described my invention and set forth its merits, what I claim and desire to secure by Letters Patent is:—

1. In a valve gear, a rotatably adjustable hub, a valve actuating cam operated by said hub, a disk carried by said hub, a slotted driving ring mounted upon said disk, and retaining means extending through said slots into said disk.

2. In a valve gear, a rotatably adjustable hub, a valve actuating cam operated by said hub, a disk carried by said hub, a slotted driving ring mounted upon said disk, retaining means extending through said slots into said disk, a lateral lug from said disk, an adjusting screw mounted therein, and a coöperating contact lug carried by said ring.

3. In a valve gear, a hub, a valve actuating cam operatively connected to said hub, a disk carried by said hub and having a circumferential shoulder upon its outer face, an annular driving gear mounted upon said shoulder and provided with slots, and clamping bolts extended through said slots and disk.

4. In a valve gear, a driving gear, a hub adjustably mounted thereon, a valve actuating cam operatively connected to said hub, a valve having an extended stem, a rock arm disposed between said cam and stem, and an adjustable tappet carried by said arm to engage said stem.

5. In a valve gear, a driving gear, a hub adjustably mounted thereon, a valve actuating cam operatively connected to said hub, a valve having an extended stem, a rock arm disposed between said cam and stem, a tappet threaded into said arm, and means for retaining said tappet in adjusted position.

6. In a valve gear, a driving gear, a hub adjustably mounted thereon, a valve actuating cam operatively connected to said hub, a valve having an extended stem, a rock arm disposed between said cam and stem, a tappet threaded into said arms, means for retaining said tappet in adjusted position, bifurcated pivoting lugs upon the face of said arm opposite said tappets, and a friction roller mounted between said lugs to engage said cam.

In testimony whereof I affix my signature in presence of two witnesses.

OSCAR R. HUKLE.

Witnesses:
  E. WHITSON,
  JNO. J. RILEY.